United States Patent

Stevens et al.

[15] 3,644,094
[45] Feb. 22, 1972

[54] PROCESS FOR THE RECOVERY OF DIAMOND PARTICLES FROM ALUMINA OR SILICATE WASTES

[72] Inventors: Douglas N. Stevens; Ramond E. Bisque; Duane N. Bloom, all of Golden, Colo.

[73] Assignee: Earth Sciences, Inc., Golden, Colo.

[22] Filed: Feb. 16, 1970

[21] Appl. No.: 11,922

[52] U.S. Cl. ................................ 23/209.9, 23/209.1, 23/143
[51] Int. Cl. ..................................... C01b 31/06, C01f 7/34
[58] Field of Search ........................ 23/209.9, 209.1 D, 143

[56] References Cited

UNITED STATES PATENTS 3,386,805   6/1968   Figiel ................................. 23/209.9
3,393,978   7/1968   Murphy ............................. 23/209.9

OTHER PUBLICATIONS

Kirk– Othmer, " Encyclopedia of Chemical Technology," John Wiley & Sons, 1964, Vol. 3; 2nd Ed.; p. 638.
Hackh's, " Chemical Dictionary," J. Grant Editor; McGraw-Hill Book Comp., Inc.; 1944, 3rd ed., p. 138.

Primary Examiner—Edward J. Meros
Assistant Examiner—G. Alvaro
Attorney—R. H. Galbreath

[57] ABSTRACT

Alumina wastes, and various silicate wastes, produced by grinding ceramic workpieces with diamond impregnated wheels are intermixed with a borax flux and heated in a nonoxidizing atmosphere to produce a fluid melt of the alumina and flux. The melt or resulting solid phase is then acid treated to dissolve and liquefy the alumina or silicate contents and the resulting liquor is drawn off leaving the particulate fraction which contains the desired diamond particles.

8 Claims, No Drawings

PROCESS FOR THE RECOVERY OF DIAMOND PARTICLES FROM ALUMINA OR SILICATE WASTES

OBJECTS OF THE INVENTION

The forming and machining of the ceramic elements which must withstand the extreme temperatures required in the present jet age requires voluminous use of exceedingly expensive diamondiferous grinding wheels and grinding discs. The abrasive operations which are required on extremely hard and difficulty fusable ceramic workpieces produces a dustlike waste material containing: minute particles of the corundum or aluminum oxide, silicates, or other binding substances of the wheels and discs; minute particles of the ceramic material of the workpiece; minute diamonds or diamond fragments, or particles which are torn or broken loose from the diamondiferous grinding wheels and discs; and perhaps contaminent residuals from cutting oils, etc., that might have been used to facilitate the grinding and cutting operations.

The waste is referred to by the producers of high quality ceramic elements as "swarf" and is usually regretfully discarded in view of the difficulty of separating and recovering the valuable constituents therefrom. Conventional gravity concentration and separation appears impossible due to the slight difference in specific gravity between the undesirable alumina or silicate materials and the desirable diamond dust in suspension therein and to the extreme fineness of the diamond particles. Attempts to volatilize or burn off the alumina appear impractical without destruction or loss of the micronic diamond particles.

This invention has for its principal object the provision of an economically feasible and highly efficient method and means for separating and recovering the diamond and byproduct values from the alumina or silicate wastes or swarf produced by diamond-containing grinding wheels.

Briefly, the invention primarily comprises charging a furnace crucible with the above dustlike waste material, first cleaned of organic materials by solvent extraction or by firing, then intermixing with a crystalline borax hydrate flux ($Na_2B_4O_7 \cdot 10H_2O$). The charge is heated (700°–1,000° C.) in a nonoxidizing atmosphere to form a fluid melt of the alumina materials and the intermixed flux, in which the only solid material will be the minute diamonds or diamond particles and other influxable materials such as carborundum. The melt, in which the solid diamond particles exist, is then discharged into an acid bath which leaches, dissolves and liquefies the alumina content of the melt sufficiently to allow the solid diamond particles therein to separate. The acid liquor is then drawn off leaving the desired diamondiferous values as an easily accessible residue in the bath. The principal object of this invention is thus accomplished.

The method may be continued to obtain other desirable results by treating the residual liquor drawn from the acid bath, containing the reacted alumina, with an acid to change its pH value so as to precipitate the alumina therefrom as a hydroxide, $Al(OH)_3$. This permits recovery of the solubilized fluxing material for recycling.

Damage to the diamond particles is prevented due to the lack of oxygen in the furnace and to the fact that the particles are totally immersed in the melt and no contact with oxygen is possible.

It has been found that the above process can in some cases be facilitated by adding a small quantity of sodium fluoride (NaF) to the melt in the furnace crucible.

Borax or borax with sodium fluoride produces a melt with characteristics that effect a physical flotation of the desired inert constituents. The latter form a scum that can be physically separated from the melt, yielding a concentrate that greatly facilitates the separation process. The sodium fluoride improves the physical flotation presumably through its effect on the fluidity of the melt.

The scum can be periodically or continuously removed from the surface in any suitable manner such as skimming or decanting to recover the desired diamond content.

If it is found that this flotation recovery is sufficient to accomplish the objects of this invention, the above-described diamond residue step can be eliminated and the residual melt from the crucible can be fed directly to the acid bath and processed to recover the flux for reuse as described above.

EXAMPLE:

1. The corundum waste or "swarf" containing minute diamond particles is first cleaned of organic contaminants such as by solvent extraction or by igniting the swarf at 500°–600° C. to burn off the organics.

2. The clean swarf is then ball-milled or otherwise physically agitated to break up all clumps or aggregates.

3. The fine swarf is then mixed intimately with the borate flux containing sodium fluoride by further ball-milling or agitation. The swarf-flux ratio should be between 1:3 and 1:5, depending on the nature of the swarf and the time of fluxing desired. Greater amounts of flux reduce the melting duration. The sodium fluoride should be added in amounts varying from one percent of the flux to five percent depending on the exact nature of the swarf. This latter ratio is determined empirically for the fluxing temperatures and times desired.

4. The swarf-flux mixture is placed in a crucible and heated to melting at 700°–1,000° C. Once a glassy melt has formed (the time depends of the size of the charge and the size and type of crucible) the crucible is held at the maximum temperature for two to five minutes.

5. The glassy melt is now cooled to form a glassy solid with the bulk of the desired constituents found concentrated on the surface and along the edges thereof.

6. The latter concentrate is now dissolved from the surface of the glassy solid and transferred by washing to a separate container, effecting the first step in the separation.

7. The portion of the desired constituents not washed from the surface of the glassy solid can be recovered by dissolving the glassy solid in hot hydrochloric acid.

8. The solubilized corundum can be precipitated as hydrated aluminum hydroxide and the sodium borates recovered from the liquor by evaporation.

While preferred forms of the invention have been described in some detail together with the theories which it is believed to best explain its success, it is to be understood that the invention is not limited to the precise procedure described nor is it dependent upon the accuracy of the theories which have been advanced. On the contrary, the invention is not to be regarded as limited except insofar as such limitations are included within the terms of the accompanying claims in which it is the intention to claim all novelty inherent in the invention as broadly as is permissible in view of the prior art.

We claim:

1. A process for recovering diamond particles from an agglomerate mixture of ceramic swarf wastes comprising:
   a. adding an alkali metal borate and sodium fluoride to said mixture as a flux;
   b. heating the intermixed wastes and flux in a substantially nonoxidizing gaseous atmosphere to a temperature sufficient to form a liquid melt of the combined wastes and flux with the diamond particles remaining in the solid phase in said melt;
   c. contacting the said mixture with an acid to leach therefrom the acid soluble constituents thereof thence,
   d. removing the dissolved and liquefied contents from said mixture to collect and recover the residual solid phase materials consisting essentially of diamond particles therefrom.

2. A process as described in claim 1 in which the alkali metal borate comprises:
   a. borax $Na_2B_4O_7 \cdot 10H_2O$.

3. A process as described in claim 1 in which the intermixed wastes and flux are:
   a. heated to a temperature of from 700° to 1,000° C.

4. A process as described in claim 1 in which:

a. The residual liquor drawn from the acid bath is treated with an acid to change its pH value sufficiently to precipitate and recover the alumina therefrom as a hydroxide, Al(OH)$_3$, and in which b. the remaining liquor is processed by evaporation to recover the flux for recycling with additional agglomerate mixture through the process.

5. A process as described in claim 1 in which:

a. the addition of the sodium fluoride (NaF) produces a floatable scum on the melt containing a concentrate of the major solid phase materials; and b. in which the said scum is physically separated from the melt for initial recovery of the solid phase materials.

6. A process for recovering diamond particles from an agglomerate mixture of alumina or corundum wastes comprising:

a. removing organic materials from said mixture;

b. physically milling the cleaned mixture to a substantially uniformly sized aggregate;

c. intimately incorporating a borate flux, containing sodium fluoride, with said agglomerate mixture;

d. heating the fluxed mixture in a substantially nonoxidizing atmosphere to 700°–1,000° C. to produce a glassy liquid melt containing solid diamond particles;

e. cooling the melt to form a glassy solid with the solid diamond particles concentrated at the surface thereof; and f. dissolving and washing the latter concentrate from the surface of the glassy solid for the recovery of the solid particles.

7. A process as described in claim 6 including:

a. dissolving the cooled glassy solid in an acid bath; and b. varying the pH value of the acid bath to precipitate the alumina therefrom as hydrated aluminum hydroxide for reuse in the process.

8. A process as described in claim 7 including:

a. recovering, by evaporation the remaining precipitant liquor, of the sodium borates from the acid bath for reuse.

* * * * *